United States Patent
Xu et al.

(10) Patent No.: US 10,197,837 B2
(45) Date of Patent: Feb. 5, 2019

(54) IN-PLANE SWITCHING ARRAY SUBSTRATE, METHOD FOR MANUFACTURING THE ARRAY SUBSTRATE, AND DISPLAY DEVICE HAVING THE ARRAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Xue Dong, Beijing (CN); Xiaochuan Chen, Beijing (CN); Lei Wang, Beijing (CN); Pengcheng Lu, Beijing (CN); Changfeng Li, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 15/305,016

(22) PCT Filed: Dec. 24, 2015

(86) PCT No.: PCT/CN2015/098722
§ 371 (c)(1),
(2) Date: Oct. 18, 2016

(87) PCT Pub. No.: WO2017/008450
PCT Pub. Date: Jan. 19, 2017

(65) Prior Publication Data
US 2017/0184895 A1    Jun. 29, 2017

(30) Foreign Application Priority Data

Jul. 14, 2015    (CN) .......................... 2015 1 0412192

(51) Int. Cl.
G02F 1/1333    (2006.01)
G02F 1/1334    (2006.01)
(Continued)

(52) U.S. Cl.
CPC ........ *G02F 1/13338* (2013.01); *G02F 1/1333* (2013.01); *G02F 1/1343* (2013.01);
(Continued)

(58) Field of Classification Search
CPC .............. G02F 1/13338; G02F 1/1368; G02F 1/13439; G02F 1/133345; G02F 1/136286;
(Continued)

(56) References Cited

U.S. PATENT DOCUMENTS

2015/0062451 A1* 3/2015 Ono .................. G02F 1/136227
349/12
2015/0370114 A1    12/2015 Du et al.
(Continued)

FOREIGN PATENT DOCUMENTS

CN    103294246 A    9/2013
CN    103472613 A    12/2013
(Continued)

OTHER PUBLICATIONS

First Office Action for Chinese Application No. 201510412192.1, dated Sep. 5, 2017, 11 Pages.
(Continued)

*Primary Examiner* — Ryan A Lubit
(74) *Attorney, Agent, or Firm* — Brooks Kushman P.C.

(57) ABSTRACT

An In-Plane Switching (IPS) array substrate, a method for manufacturing the IPS array substrate and a display device
(Continued)

are provided. The common electrodes of the IPS array substrate further function as touch electrodes, thereby implementing a built-in touch display device. The IPS array substrate is further provided with signal lines that are electrically connected to the touch electrodes in a one-to-one correspondence. During a touch time period included in a time period for displaying one frame of image, it is detected, through the corresponding signal lines, whether self-capacitances of the touch electrodes are changed, so as to determine a touch position.

13 Claims, 7 Drawing Sheets

(51) Int. Cl.
| | | |
|---|---|---|
| G02F 1/1337 | (2006.01) | |
| G02F 1/1343 | (2006.01) | |
| G02F 1/1362 | (2006.01) | |
| G02F 1/1368 | (2006.01) | |
| G06F 3/041 | (2006.01) | |
| G06F 3/044 | (2006.01) | |
| G06F 3/047 | (2006.01) | |

(52) U.S. Cl.
CPC .......... *G02F 1/1362* (2013.01); *G02F 1/1368* (2013.01); *G02F 1/13439* (2013.01); *G02F 1/133345* (2013.01); *G02F 1/133707* (2013.01); *G02F 1/134363* (2013.01); *G02F 1/136286* (2013.01); *G06F 3/044* (2013.01); *G06F 3/047* (2013.01); *G06F 3/0412* (2013.01); *G06F 3/0416* (2013.01); *G02F 2001/136295* (2013.01); *G02F 2201/121* (2013.01); *G02F 2201/123* (2013.01); *G06F 2203/04103* (2013.01)

(58) Field of Classification Search
CPC ......... G02F 1/133707; G02F 1/134363; G06F 3/044; G06F 3/047
See application file for complete search history.

(56) References Cited

U.S. PATENT DOCUMENTS

| | | |
|---|---|---|
| 2016/0048233 A1 | 2/2016 | Wang et al. |
| 2016/0048240 A1 | 2/2016 | Wang et al. |
| 2016/0253024 A1* | 9/2016 | Aoyama ............... G06F 3/0416 345/174 |
| 2016/0259445 A1 | 9/2016 | Yang et al. |
| 2016/0274715 A1* | 9/2016 | Wang ..................... G02F 1/13 |
| 2016/0274716 A1 | 9/2016 | Liu et al. |
| 2016/0320882 A1* | 11/2016 | Kim ........................ G06F 3/044 |
| 2016/0380004 A1* | 12/2016 | Lee .................... H01L 27/1225 349/46 |
| 2017/0184895 A1 | 6/2017 | Xu et al. |
| 2017/0364203 A1* | 12/2017 | Azumi ................. G06F 3/0416 |

FOREIGN PATENT DOCUMENTS

| | | |
|---|---|---|
| CN | 104020893 A | 9/2014 |
| CN | 104020907 A | 9/2014 |
| CN | 104020909 A | 9/2014 |
| CN | 104022128 A | 9/2014 |
| CN | 104062817 A | 9/2014 |
| CN | 204203592 U | 3/2015 |
| CN | 105093736 A | 11/2015 |
| KR | 1020130009517 A | 1/2013 |
| KR | 1020130137403 A | 12/2013 |
| KR | 1020150073418 A | 7/2015 |

OTHER PUBLICATIONS

International Search Report and Written Opinion for Application No. PCT/CN2015/098722, dated Apr. 11, 2016, 10 Pages.

* cited by examiner

IN-PLANE SWITCHING ARRAY SUBSTRATE, METHOD FOR MANUFACTURING THE ARRAY SUBSTRATE, AND DISPLAY DEVICE HAVING THE ARRAY SUBSTRATE

CROSS-REFERENCE TO RELATED APPLICATIONS

This application is the U.S. national phase of PCT Application No. PCT/CN2015/098722 filed on Dec. 24, 2015, which claims priority to Chinese Patent Application No. 201510412192.1 filed on Jul. 14, 2015, the disclosures of which are incorporated in their entirety by reference herein.

TECHNICAL FIELD

The present disclosure relates to the technical field of touch display technology, in particular to an In-Plane Switching (IPS) array substrate, a method for manufacturing the IPS array substrate, and a display device.

BACKGROUND

Among touch screen technologies, comparing with a resistive touch screen, a capacitive touch screen has advantages such as long service life, high light transmittance and multi-touch support. Furthermore, in the capacitive touch screen, noises and parasitic capacitance relative to the ground are well suppressed. Therefore, the capacitive touch screen has become one of hot spots in touch screen manufacturing industry nowadays. The capacitive touch screens can be classified into two categories, i.e. a self-capacitive touch screen and a mutual-capacitive touch screen. In the self-capacitive touch screen, merely one layer of touch electrodes is arranged, and a touch operation may be easily detected by determining whether self capacitances of the respective touch electrodes are changed. Therefore, the self-capacitive touch screen has advantages such as simple structure and easy implementation.

In recent years, a trend in the industry is to manufacture the display device with a thinner thickness. As a result, display panel manufactures are in favor of embedding the touch electrodes of the touch screen into a display panel of a built-in touch display device, so as to reduce the thickness of the display device, meanwhile it enables to significantly reduce cost for manufacturing the touch display devices.

SUMMARY

The present disclosure provides an IPS array substrate, a method for manufacturing the IPS array substrate and a display device.

The present disclosure provides in some embodiments an IPS array substrate, including a display region and a non-display region around the display region. Multiple pixel units are arranged in the display region, each of the pixel units includes a slit common electrode and a slit pixel electrode, a time period for displaying one frame of image includes a display time period and a touch time period, the slit common electrodes further function as multiple touch electrodes, each of the touch electrodes includes two or more slit common electrodes that are electrically connected. The IPS array substrate further includes: multiple signal lines that are electrically connected to the multiple touch electrodes in a one-to-one correspondence, during the display time period, common voltage signals are transmitted to the touch electrodes by the corresponding signal lines, and during the touch time period, it is detected, through the corresponding signal lines, whether self-capacitances of the touch electrodes are changed.

Optionally, the IPS array substrate is a Thin Film Transistor (TFT) array substrate and includes data lines and gate lines, regions of the pixel units are defined by intersections of the data lines and the gate lines, each of the pixel units further includes a TFT, long edges of slits of the slit common electrodes and long edges of slits of the slit pixel electrodes are substantially parallel to an extending direction of each of the data lines. The signal lines, the gate lines and gate electrodes of the TFTs are made of a same material and arranged at a same layer; or the signal lines, the data lines, and source electrodes and drain electrodes of the TFTs are made of a same material and arranged at a same layer.

Optionally, in the above IPS array substrate, an insulation layer is arranged between the signal lines and the touch electrodes, and each of the signal lines is electrically connected to the corresponding touch electrode through a corresponding via hole in the insulation layer.

Optionally, in the above array substrate, the insulation layer includes a gate insulation layer and a passivation layer. The IPS array substrate includes: a base substrate; the gate lines, the signal lines and the gate electrodes of the TFTs that are arranged at a same layer on the base substrate and made of a same material; the gate insulation layer that covers the gate lines, the signal lines and the gate electrodes; active layers of the TFTs that are arranged on the gate insulation layer; the data lines, the source electrodes and the drain electrodes of the TFTs that are arranged at a same layer and made of a same material, where each of the source electrodes and the corresponding drain electrode are lapped on two opposite sides of the corresponding active layer respectively; the pixel electrodes that are lapped on the drain electrodes respectively; the passivation layer that covers the TFTs and the pixel electrodes; and the common electrodes that are arranged on the passivation layer, where a projection of each signal line onto the base substrate overlaps a projection of the corresponding common electrodes onto the base substrate, and the corresponding common electrodes are electrically connected to the each signal line through the corresponding via hole penetrating through the gate insulation layer and the passivation layer.

Optionally, in the above array substrate, each of the signal lines is not electrically connected to any one of the touch electrodes other than the corresponding touch electrode.

Optionally, in the above array substrate, each of the touch electrodes is lapped on and electrically connected to the corresponding signal line.

Optionally, in the above array substrate, wherein each of the signal lines is separated from and not electrically connected to any one of the touch electrodes other than the corresponding touch electrode.

Optionally, in the above array substrate, portions of the signal lines arranged in the display region are arranged parallel to the gate lines; or portions of the signal lines arranged in the display region are arranged parallel to the data lines.

Optionally, in the above array substrate, the signal lines each extend from the display region to the non-display region, and the signal lines extend from the display region to sides of two opposite long edges of the IPS array substrate being of a rectangular shape.

The present disclosure further provides in some embodiments a method for manufacturing the IPS array substrate. The IPS array substrate includes a display region and a non-display region around the display region, the method includes a step of forming of the multiple pixel units in the display region. Each of the pixel units includes the slit common electrode and the slit pixel electrode, the time period for displaying one frame of image includes the display time period and the touch time period. The slit common electrodes further function as multiple touch electrodes, each of the touch electrodes includes two or more slit common electrodes that are electrically connected. The method further includes a step of forming the multiple signal lines that are electrically connected to the touch electrodes in the one-to-one correspondence. During the display time period, the common voltage signals are transmitted to the touch electrodes by the corresponding signal lines, and during the touch time period, it is determined, through the corresponding signal lines, whether the self-capacitances of the touch electrodes are changed.

Optionally, in the above method, the IPS array substrate is a Thin Film Transistor (TFT) array substrate and includes data lines and gate lines. Regions of the pixel units are defined by intersections of the data lines and the gate lines, each of the pixel units further includes a TFT. Long edges of slits of the slit common electrodes and long edges of slits of the slit pixel electrodes are substantially parallel to an extending direction of each of the data lines. The step of forming of the multiple signal lines includes: forming the signal lines, the gate lines and gate electrodes of the TFTs by a patterning process on a same gate metal layer, or forming the signal lines, the data lines, and source electrodes and drain electrodes of the TFTs by a patterning process on a same source-drain metal layer.

Optionally, the method includes steps of: forming the gate metal layer, and forming a pattern including the signal lines by a patterning process on the gate metal layer; forming an insulation layer, and forming via holes by a patterning process on the insulation layer; forming a transparent conductive layer on the insulation layer, and forming the common electrodes by a patterning process on the transparent conductive layer, where the common electrodes are electrically connected to the corresponding signal lines through the corresponding via holes in the insulation layer.

Optionally, in the above method, the insulation layer includes a gate insulation layer and a passivation layer. The method includes steps of: providing a base substrate; forming the gate metal layer on the base substrate, and forming the gate lines, the signal lines and the gate electrodes of the TFTs by a patterning process on the gate metal layer; forming the gate insulation layer that covers the gate lines, the signal lines and the gate electrodes; forming active layers of the TFTs on the gate insulation layer; forming the source-drain metal layer on the active layers, and forming the data lines, and the source electrodes and the drain electrodes of the TFTs by a patterning process on the source-drain metal layer; forming the pixel electrodes that are lapped on the drain electrodes respectively; forming the passivation layer that covers the TFTs and the pixel electrodes; forming the via holes by a patterning process on the passivation layer and the gate insulation layer and exposing the signal lines from the via holes; forming the common electrodes on the passivation layer, where a projection of each signal line onto the base substrate overlaps a projection of the corresponding common electrodes onto the base substrate, and the corresponding common electrodes are electrically connected to the each signal line through the corresponding via hole penetrating through the gate insulation layer and the passivation layer.

Optionally, the method includes steps of: forming the gate metal layer, and forming a pattern including the signal lines by a patterning process on the gate metal layer; forming a transparent conductive layer, and forming the common electrodes by a patterning process on the transparent conductive layer, where each of the touch electrodes is lapped on and electrically connected to the corresponding signal line.

The present disclosure further provides in some embodiments a display device including the above IPS array substrate.

In the above solutions, the common electrodes of the IPS array substrate further function as the touch electrodes, so as to implement a built-in touch display device with a thinner thickness. Meanwhile, it enables to eliminate "ghost point" phenomenon which appears in a process of detecting a touch operation on the self-capacitive touch screen in related technology, reduce detection time and improve touch sensitivity.

BRIEF DESCRIPTION OF THE DRAWINGS

In order to illustrate the technical solutions of the present disclosure in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

Figure 1:
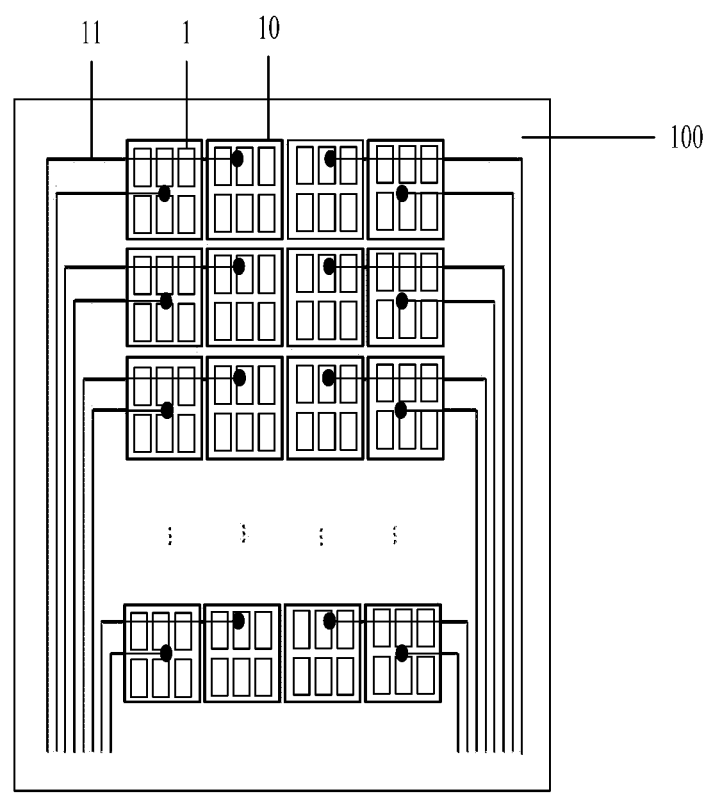
FIG. 1 is a schematic view showing an IPS array substrate according to some embodiments of the present disclosure.

In the following, before introducing technical solutions of the present disclosure, it is firstly explained some concepts and principles involved herein.

A Thin Film Transistor-Liquid Crystal Display (TFT-LCD) mainly includes a LCD panel including a TFT array substrate and a color filter substrate that are aligned oppositely to form a cell, and liquid crystal molecules are filled between the array substrate and color filter substrate. The array substrate includes multiple gate lines and multiple data lines for defining regions of pixel units, and each of the pixel units includes a TFT, a pixel electrode and a common electrode. The TFT is turned on by a gate line, a pixel voltage on a data line is inputted to the pixel electrode via the TFT, so as to generate an electric field between the pixel electrode and the common electrode for driving the liquid crystal molecules to deflect for a certain angle and achieve grey-scale display. A light filter layer of the color filter substrate is arranged to achieve color display. The TFT-LCD has advantages such as small size, low power consumption and zero radiation.

In an IPS display mode, nematic liquid crystals are used, both the common electrodes and the pixel electrodes are slit electrodes arranged on the array substrate, and the slits of the common electrodes and the slits of the pixel electrodes are arranged in an alternate manner. The IPS technology is distinctive for orienting the liquid crystal molecules to be in a non-light-transmissible mode in advance instead of being in a light-transmissible mode, and then controlling an amount of light transmission by applying an electric field. When no electrical field is applied, the liquid crystal molecules are oriented in the non-light-transmissible mode, and thus the IPS display mode is a mode in dark and has an advantage of high contrast. When the electric field is applied, the liquid crystal molecules are deflected to the light-transmissible mode, a brightness of an IPS display is not affected by a view angle of a watcher observing the display in substance, and thus the IPS display mode has a further advantage of wide viewing angle. Furthermore, the IPS display mode has advantages such as high resolution, high light transmittance, low power consumption, high aperture ratio, low chromatic aberration, and push mura free.

Capacitive touch detections may be classified into a self-capacitive touch detection and a mutual-capacitive touch detection. In the self-capacitive touch detection, merely one layer of touch electrodes is arranged, and a touch operation may be easily detected by determining whether self-capacitances of respective touch electrodes are changed. Therefore, the self-capacitive touch screen has advantages such as simple structure and easy implementation. The self-capacitance of the touch electrode is the capacitance of a capacitor formed by the touch electrode and the ground.

In the related technology, the touch electrodes of the self-capacitive touch screen are arranged in a two-dimensional array. In a relative touch detection method, electric charges are transmitted using a change of the self-capacitance of a touch electrode, one end of the touch electrode is grounded and the other end of the touch electrode is connected to an exciting circuit or a sampling circuit, so as to detect the change of the self-capacitance. In particular, a horizontal detection and a vertical detection are successively performed on the array of touch electrodes, to respectively determine a horizontal coordinate value and a longitudinal coordinate value of a touch point based on a change of a self-capacitance before and after the touch operation. When there is merely one touch point, there are one horizontal coordinate value and one longitudinal coordinate value, which may be combined into one two-dimensional coordinate. When there are two touch points, there are two horizontal coordinate values and two longitudinal coordinate values, which may be combined in pairs into four two-dimensional coordinates; two of the four coordinates represent actual touch points, while the other two represent "ghost points". As a result, the multi-point touch function cannot be achieved in substance in the related technology.

The present disclosure will be specifically described hereinafter in conjunction with the drawings and embodiments. The following embodiments are for illustrative purposes and shall not be used to limit the scope of the present disclosure.

FIG. 1 is a schematic view showing an IPS array substrate according to some embodiments of the present disclosure.

As shown in FIG. 1, the present disclosure provides in some embodiments an IPS array substrate including a display region and a non-display region around the display region. Multiple pixel units are arranged in the display region, and each of the pixel units includes a slit common electrode 1 and a slit pixel electrode 2 (not shown in FIG. 1). Slits of the common electrode 1 and slits of the pixel electrode 2 are arranged in an alternate manner and cooperate to form an electric field for driving liquid crystal molecules to deflect. The common electrodes further function as multiple touch electrodes 10, and each of the touch electrodes 10 corresponds to two or more common electrodes 1 that are electrically connected, so as to embed a touch screen into a display panel and obtain a touch display device with a thinner thickness.

Figure 3:
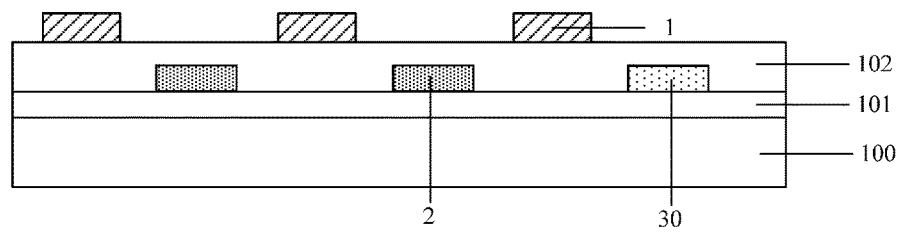
FIG. 3 is a sectional view along a line A-A' in FIGS. 2 and 5, where the common electrodes are arranged above the pixel electrodes.
Figure 4:
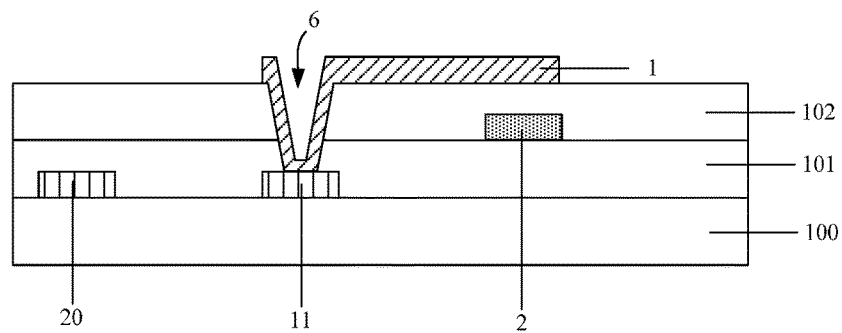
FIG. 4 is a sectional view along a line B-B' in FIG. 2, where the common electrodes are arranged above the pixel electrodes.

As shown in FIG. 1, the array substrate further includes multiple signal lines 11 that are electrically connected to the multiple touch electrodes 10 in a one-to-one correspondence. For the array substrate, a time period for displaying one frame of image includes a display time period and a touch time period. As shown in FIGS. 1, 3 and 4, in the display time period, common voltage signals are transmitted to the touch electrodes 10 via corresponding signal lines 11, so as to provide reference voltages for the common electrodes 1 and form electric fields between the common electrodes 1 and the pixel electrodes 2 for driving the liquid crystal molecules to deflect for certain angles. In the touch time period, it is detected, through corresponding signal lines 11, whether self-capacitances of the touch electrodes 10 are changed, so as to determine a touch position. In addition, since the signal lines 11 and the touch electrodes 10 are in the one-to-one correspondence, a detection signal obtained from each of the signal lines uniquely corresponds to one of the touch electrodes 10. As a result, even if two or more touch electrodes 10 are touched simultaneously, the two or more touch positions can be determined precisely, and it enables to eliminate "ghost point" phenomenon which appears in the process of detecting a touch operation on the self-capacitive touch screen in the related technology. Furthermore, self capacitances of all touch electrodes 10 can be detected simultaneously. Comparing with the related technology where the horizontal detection and the vertical detection are successively performed on the array of touch electrodes, the present disclosure enables to reduce the detection time and improve the touch sensitivity.

Each of the common electrodes 1 may be of a regular shape such as rectangle, diamond, triangle, circle or oval, or may be of an irregular shape which is not particularly defined herein. The number of the common electrodes corresponding to each of the touch electrodes 10 is also not particularly defined herein, as long as a desired precision for the touch detection can be met.

The IPS array substrate may be a TFT array substrate and includes multiple gate lines 20 and multiple data lines 30, regions of multiple pixel units are defined by intersections of the multiple gate lines 20 and the multiple data lines 30, and each of the pixel units further includes a TFT. Long edges of the slits of the common electrodes 1 and long edges of the slits of the pixel electrodes 2 are substantially parallel to an extending direction of each data line 30. Each of the common electrodes 1 is arranged inside the corresponding pixel unit and does not overlap any gate line 20 and any data line 30, thereby reducing coupling capacitances between the common electrodes 1 and the gate lines 20 and coupling capacitances between the common electrodes 1 and the date lines 30. When the common electrodes 1 further function as the touch electrodes 10, it enables to maximally reduce a response time of touch detection.

Optionally, the signal lines 11, the gate lines 20 and gate electrodes of the TFTs are made of a same material and arranged at a same layer; or the signal lines 11, the data lines 30, and source electrodes 3 and drain electrodes of the TFTs are made of a same material and arranged at a same layer. In other words, the signal lines 11 and the gate electrodes of the TFTs are simultaneously formed by a patterning process on a same gate metal layer; or the signal lines 11 and the source electrodes 3 and the drain electrodes of the TFTs are simultaneously formed by a patterning process on a same source-drain metal layer. As a result, the signal lines 11 need not be made independently, which simplifies the manufacturing process, saves the material and reduces the manufacturing cost. Since a resistivity of a transparent conductive material is greater than both a resistivity of the gate metal and a resistivity of the source-drain metal, the signal lines 11 are typically not made by a transparent conductive layer. The gate electrode and the gate line 20 are of an integrated structure, and the gate electrode is not shown in figures.

Generally, the signal lines 11 may be arranged as uniformly as possible, and the traces may be arranged as short as possible and as narrow as possible, so as to facilitate extending the signal lines 11 from the display region to the non-display region. In particular, the portions of the signal lines 11 in the display region may be arranged to be parallel to the gate lines 20 or the data lines 30. The portions of the signal lines 11 in the non-display region may be arranged to be parallel to each other or arranged in a fan shape. As shown in FIG. 1, the signal lines 11 may extend from the display region to sides of two opposite long edges of the IPS array substrate being of a rectangular shape, so as to reduce lengths of the portions of the signal lines 11 in the display region and consequently reduce the lengths of the signal lines 11.

In the embodiments of the present disclosure, the signal lines 11 and the gate electrodes of the TFTs are arranged at a same layer and made of a same material, and the portions of the signal lines 11 in the display region are arranged to be parallel to the gate lines 20, each of the gate lines 20 and the corresponding signal line 11 are spaced apart from each other, so as to be insulated from each other. Alternatively, the signal lines 11 and the source electrodes 3 and the drain electrodes of the TFTs are arranged at a same layer and made of a same material, and the portions of the signal lines 11 in the display region are arranged to be parallel to the data lines 30, each of the data lines 30 and the corresponding signal line 11 are spaced apart from each other, so as to be insulated from each other.

In technical solution of the present disclosure, the common electrodes further function as the touch electrodes of the self-capacitive touch screen, so as to implement the built-in touch display device with the thinner thickness. Meanwhile, it enables to avoid "ghost point" phenomenon which appears in a process of detecting a touch operation on the self-capacitive touch screen in related technology, reduce touch detection time and improve touch sensitivity.

Since the common electrodes 1 further function as the touch electrodes 10 and each of the touch electrodes 10 includes multiple common electrodes that are electrically connected, the electrical connection between each of the signal lines 10 and the corresponding touch electrode 10 indicates the electrical connection between each of the signal lines 10 and at least one of the common electrodes 1 included in the corresponding touch electrode 10. In particular, each of the signal line 11 may be electrically connected to one of the common electrodes 1 included in the corresponding touch electrode 10, so as to simplify the circuit. The common electrodes 1 included in each touch electrode 10 may be electrically connected to each other by connection lines (not shown in the drawings) which may be formed simultaneously with forming the common electrodes 1, and thus the connection lines and the common electrode 1 may be of an integrated structure.

Hereinafter, in some embodiments, it is assumed that each of the signal lines 11 is electrically connected to one common electrode 1 included in the corresponding touch electrode 10, and the electrical connection between the signal line 11 and the corresponding touch electrode 10 will be explained.

Figure 2:
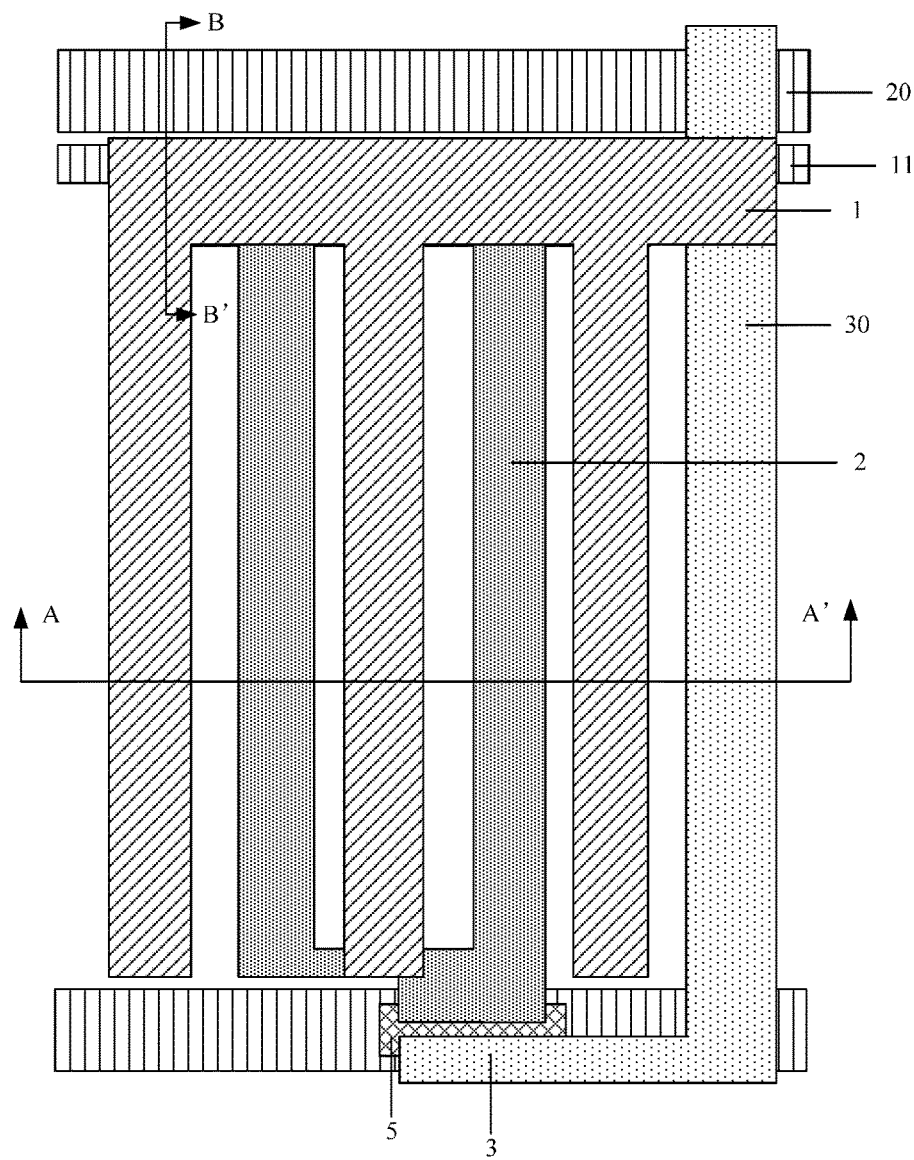
FIG. 2 is a schematic view showing one pixel unit of an IPS array substrate in which common electrodes are arranged above or below pixel electrodes according to some embodiments of the present disclosure.
Figure 5:
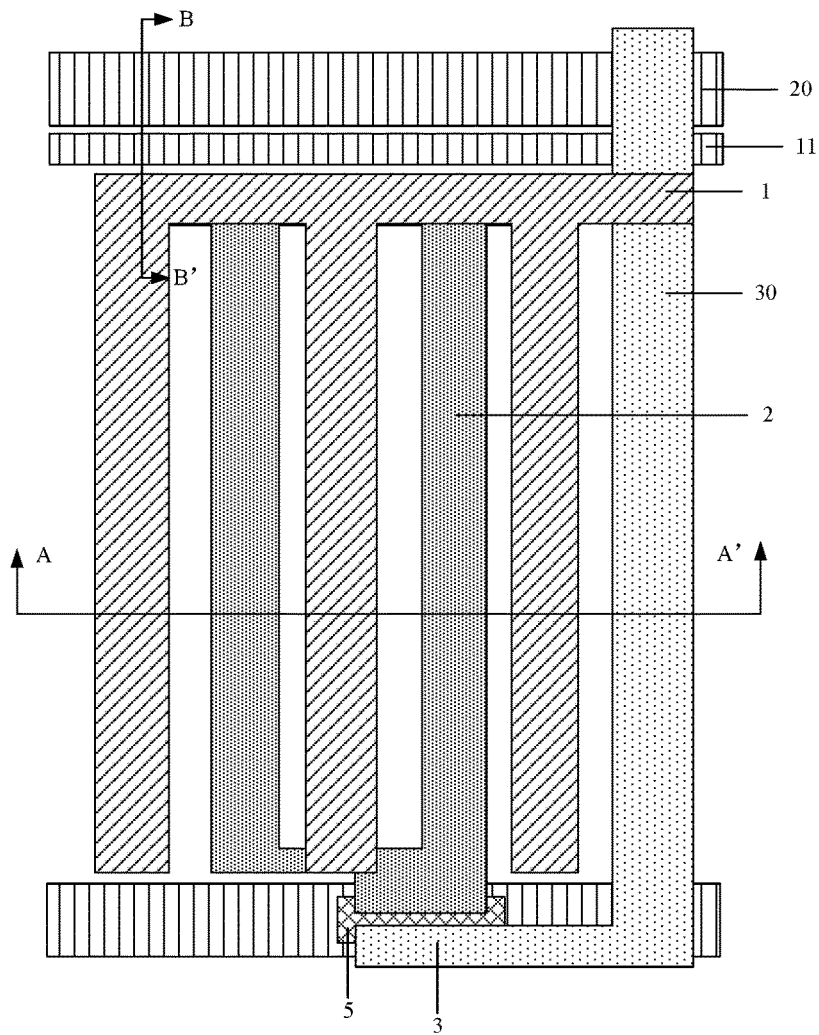
FIG. 5 is a schematic view showing one pixel unit of an IPS array substrate in which common electrodes are arranged above or below pixel electrodes according to some embodiments of the present disclosure.
Figure 6:
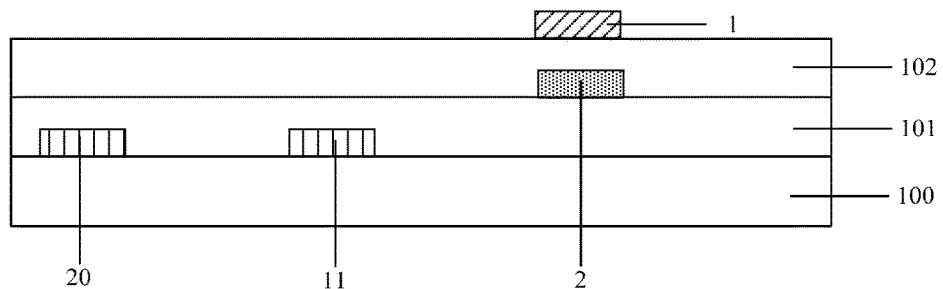
FIG. 6 is a sectional view along a line B-B' in FIG. 5, where the common electrodes are arranged above the pixel electrodes.

FIG. 2 is a schematic view showing a pixel unit of an IPS array substrate according to some embodiments of the present disclosure; FIG. 5 is a schematic view showing a pixel unit of an IPS array substrate according to some embodiments of the present disclosure; FIG. 3 is a sectional view along a line A-A' in FIGS. 2 and 5; FIG. 4 is a sectional view along a line B-B' in FIG. 2; and FIG. 6 is a sectional view along a line B-B' in FIG. 5. In particular, FIG. 2 illustrates the relative positions of the signal lines 11 and the touch electrodes 10 that are electrically connected; FIG. 5 illustrates the relative positions of the signal lines 11 and the touch electrodes 10 that are not electrically connected; and in structures shown in FIGS. 2 and 5, the common electrodes 1 may be arranged either above or below the pixel electrodes 2. It is assumed for example that the common electrodes 1 are arranged above the pixel electrodes 2 herein.

In some embodiments, as shown in FIGS. 1-4, a first film layer for forming the touch electrodes 10 (i.e. the first film layer for forming the common electrodes 1) is isolated from a second film layer for forming the signal lines 11, and an insulation layer is arranged between the first film layer and the second film layer. In other words, the insulation layer is arranged between the signal lines 11 and the touch electrodes 10, each of the signal lines 11 is electrically connected to a corresponding touch electrode 10 through a corresponding via hole in the insulation layer. As shown in FIGS. 2, 4 and 7-9, a process for forming the signal lines 11 and the touch electrodes 10 may include steps of:

forming the second film layer for forming the signal lines 11, and forming a pattern including multiple signal lines 11 by a patterning process on the second film layer; where the second film layer is made of a gate metal, and patterns of the multiple signal lines 11, multiple gate lines 20 and gate electrodes of TFTs are simultaneously formed by a patterning process on the second film layer, and each of the gate electrodes and the corresponding gate line 20 form an integrated structure;

forming the insulation layer on the second film layer, and forming via holes 6 in the insulation layer by a patterning process on the insulation layer; where the insulation layer includes a gate insulation layer 101 and a passivation layer 102; and forming the first film layer for forming the touch electrodes 10 on the insulation layer, and forming a pattern including multiple touch electrodes 10 by a patterning process on the first film layer; where each of the touch electrodes 10 is electrically connected to the corresponding signal line 11 through the corresponding via hole 6. In particular, one common electrode 1 included in the touch electrode 10 is electrically connected to the corresponding signal line 11 through the corresponding via hole 6. In particular, the first film layer is made of a transparent conductive material, the pattern including the multiple common electrodes 1 is formed by the patterning process on the first film layer, the multiple common electrodes 1 further function as multiple touch electrodes 10, and each of the touch electrodes 10 includes two or more common electrodes 1 that are electrically connected.

As shown in FIGS. 1, 5 and 6, in an extending direction of each of the signal lines 11 from the display region to the non-display region, the insulation layer is arranged between each of the signal lines 11 and any one of the touch electrodes 10 other than the corresponding touch electrode 10. In particular, the insulation layer is arranged between each of the signal lines 11 and the common electrodes 1 included in any one of the touch electrodes 10 other than the corresponding touch electrode 10, so that the signal line 11 and any one of the touch electrodes 10 other than the corresponding touch electrode 10 are not electrically connected. Since the insulation layer is arranged between each of the signal lines 11 and any one of the touch electrodes 10 other than the corresponding touch electrode 10, each of the signal lines 11 may overlap any one of the touch electrodes 10 other than the corresponding touch electrode 10, thereby alleviating an impact on an aperture ratio of a pixel by the signal line 11.

Alternatively, in the above steps, firstly the touch electrodes 10 may be formed, and then the signal lines 11 may be formed.

Figure 10:
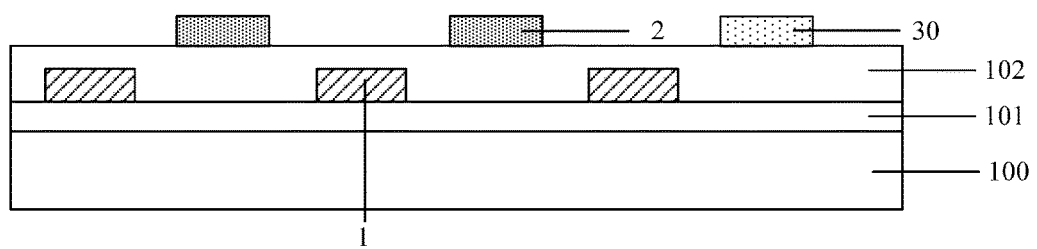
FIG. 10 is a sectional view along a line A-A' in FIGS. 2 and 5, where the common electrodes are arranged below the pixel electrodes.
Figure 11:
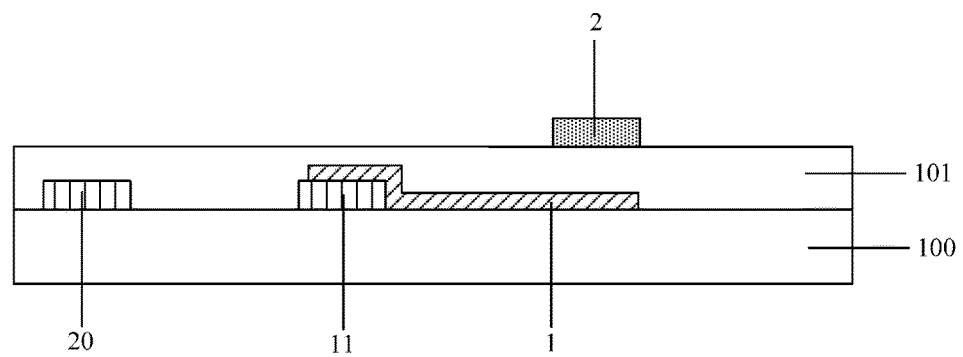
FIG. 11 is a sectional view along a line B-B' in FIG. 2, where the common electrodes are arranged below the pixel electrodes.
Figure 12:
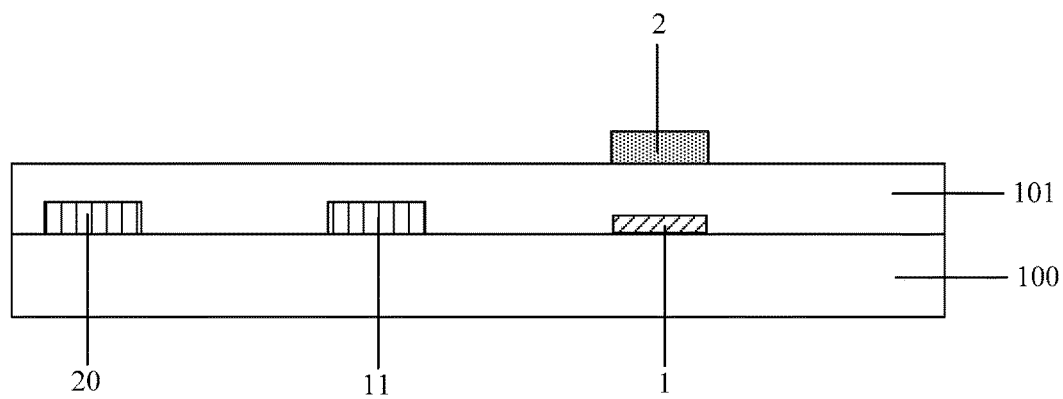
FIG. 12 is a sectional view along a line B-B' in FIG. 5, where the common electrodes are arranged below the pixel electrodes.

Hereinafter, it is assumed for example that the common electrodes 1 as shown in FIGS. 2 and 5 are arranged below the pixel electrodes 2. FIG. 10 is a sectional view along the line A-A' in FIGS. 2 and 5; FIG. 11 is a sectional view along the line B-B' in FIG. 2; and FIG. 12 is a sectional view along the line B-B' in FIG. 5.

In some embodiments, as shown in FIGS. 2, 10 and 11, a first film layer for forming the touch electrodes 10 (i.e. the first film layer for forming the common electrodes 1) is arranged to be in contact with a second film layer for forming the signal lines 11, and no layer is arranged between the first film layer and the second film layer. Each of the touch electrodes 10 is lapped on and electrically connected to the corresponding signal line 11. In particular, one common electrodes 1 included in each touch electrode 10 is lapped on the corresponding signal line 11, so that the multiple signal lines 11 and the multiple touch electrodes 10 are electrically connected in a one-to-one correspondence.

As shown in FIGS. 1, 5, 10 and 12, in the extending direction of each of the signal lines 11 from the display region to the non-display region, each of the signal lines 11 is separated from and not electrically connected to any one of the touch electrodes 10 other than the corresponding touch electrode 10. In particular, in the extending direction of each of the signal lines 11 from the display region to the non-display region, each of the signal lines 11 is separated from common electrodes 1 included in any one of the touch electrodes 10 other than the corresponding touch electrode 10, so that each of the signal lines 11 is not electrically connected to any one of the touch electrodes 10 other than the corresponding touch electrode 10.

It should be noted that, the touch electrode 10 is lapped on the corresponding signal line 11 indicates that there is a portion of the signal line 11 overlaps and is in contact with a portion of the touch electrode 10. As shown in FIGS. 10 and 12, a process for forming the signal lines 11 and the touch electrodes 10 may include steps of:

forming the second film layer for forming the signal lines 11, and forming a pattern including multiple signal lines 11 by a patterning process on the second film layer; where, the second film layer is made of a gate metal, and patterns of the multiple signal lines 11, multiple gate lines 20 and gate electrodes of TFTs are simultaneously formed by a patterning process on the second layer, and each of the gate electrodes and the corresponding gate line 20 form an integrated structure; and forming the first film layer for forming the touch electrodes 10 on the second film layer, and forming a pattern including multiple touch electrodes 10 by a patterning process on the first film layer; where each of the touch electrodes 10 is lapped on the corresponding signal line 11. In particular, one common electrode 1 included in each touch electrode 10 is lapped on the corresponding signal line 11. In particular, the first film layer is made of a transparent conductive material, the pattern including the multiple common electrodes 1 is formed by a patterning process on the first film layer, the multiple common electrodes 1 further function as multiple touch electrodes 10, and each of the multiple touch electrodes 10 includes two or more common electrodes 1 that are electrically connected.

Alternatively, in the above steps, firstly the touch electrodes 10 may be formed, and then the signal lines 11 may be formed.

In the above embodiments, when the IPS array substrate is a TFT array substrate, the second film layer for forming the signal lines 11 may be a source-drain metal layer. In particular, source electrodes 3 and drain electrodes of the TFTs, the data lines 30 and the signal lines 11 parallel to the data lines 30 are simultaneously formed from one source-drain metal layer. The signal lines 11, the data lines 30, the source electrodes 3 and the drain electrodes are arranged at the same layer and made of the same material. In addition, the signal lines 11 and the data lines 30 are spaced apart by a certain distance and insulated from each other.

In some embodiments, it is assumed that the TFTs are bottom-gate TFTs. As shown in FIGS. 1-6, the IPS TFT array substrate includes:

a base substrate 100, where the base substrate 100 may be a transparent substrate such as a glass substrate, a quartz substrate or an organic resin substrate and include multiple pixel regions;

multiple gate lines 20, multiple signal lines 11 and gate electrodes of the TFTs that are arranged at a same layer on the base substrate 100, and made of a same material;

a gate insulation layer 101 that are arranged on the multiple gate lines 20, the multiple signal lines 11 and the gate electrodes;

active layers 5 of the TFTs that are arranged on the gate insulation layer 101, where the active layers 5 are made of a silicon semiconductor or a metal oxide semiconductor;

multiple data lines 30, source electrodes 3 and drain electrodes of the TFTs that are arranged on the gate insulation layer 101, where the multiple pixel regions are defined by intersections of the gate lines 20 and the data lines 30, and the source electrodes 3 and the drain electrodes are lapped on two opposite sides of the active layers 5 respectively;

pixel electrodes 2 that are arranged on the gate insulation layer 101, where a portion of each of the pixel units 2 is lapped on the drain electrode of the corresponding TFT;

a passivation layer 102 that is arranged on the TFTs;

multiple common electrodes 1 that are arranged on the passivation layer 102, where each of the multiple common electrodes 1 is arranged in the corresponding pixel region, the multiple common electrodes 1 further function as multiple touch electrodes 10, and each of the multiple touch electrodes 10 includes two or more common electrodes 1 that are electrically connected. The signal lines 11 and the touch electrodes 10 are in a one-to-one correspondence, and one common electrode 1 included in each of the touch electrodes 10 is electrically connected to the corresponding signal line 11 through a corresponding via hole 6 penetrating through the gate insulation layer 101 and the passivation layer 102.

As shown in FIGS. 1-9, a method for manufacturing the IPS TFT array substrate includes following steps.

Step S1 includes providing the base substrate 100 including the multiple pixel regions.

Figure 7:
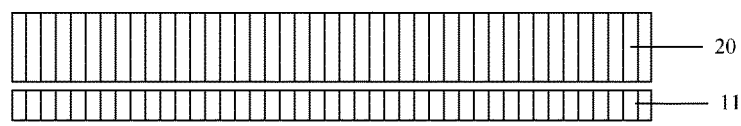
FIGS. 7-9 are schematic views showing a procedure of manufacturing one pixel unit of an IPS array substrate according to some embodiments of the present disclosure.
Figure 7:
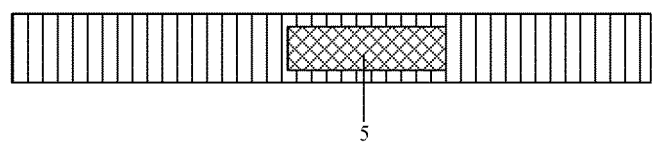

Step S2 includes forming a gate metal layer on the base substrate 100, and forming the multiple gate lines 20, the multiple signal lines 11 and the gate electrodes of the TFTs by a patterning process on the gate metal layer. The signal lines 11 and the gate lines 20 are parallel to each other, and each of the gate electrodes and the corresponding gate line 20 form an integrated structure, as shown in FIG. 7.

The gate metal layer may be made of a metal such as Cu, Al, Ag, Mo, Cr, Nd, Ni, Mn, Ti, Ta, W or an alloy of two or more of the above metals, and the gate metal layer may be of a single layer structure or a multi-layer structure such as Cu\Mo, Ti\Cu\Ti or Mo\Al\Mo.

Step S3 includes forming the gate insulation layer 101 on the base substrate 100 processed by step S2, as shown in FIG. 4.

The gate insulation layer 101 may be made of oxide, nitride or nitrogen oxide, and may be of a single layer structure, a double layer structure or a multi-layer structure, and in particular, the gate insulation layer 101 may be made of SiNx, SiOx or Si(ON)x.

Step S4 includes forming the active layers 5 of the TFTs on the gate insulation layer 101, as shown in FIG. 7.

The active layers 5 may be made of a silicon semiconductor or a metal oxide semiconductor such as indium zinc oxide or indium tin oxide.

Figure 8:
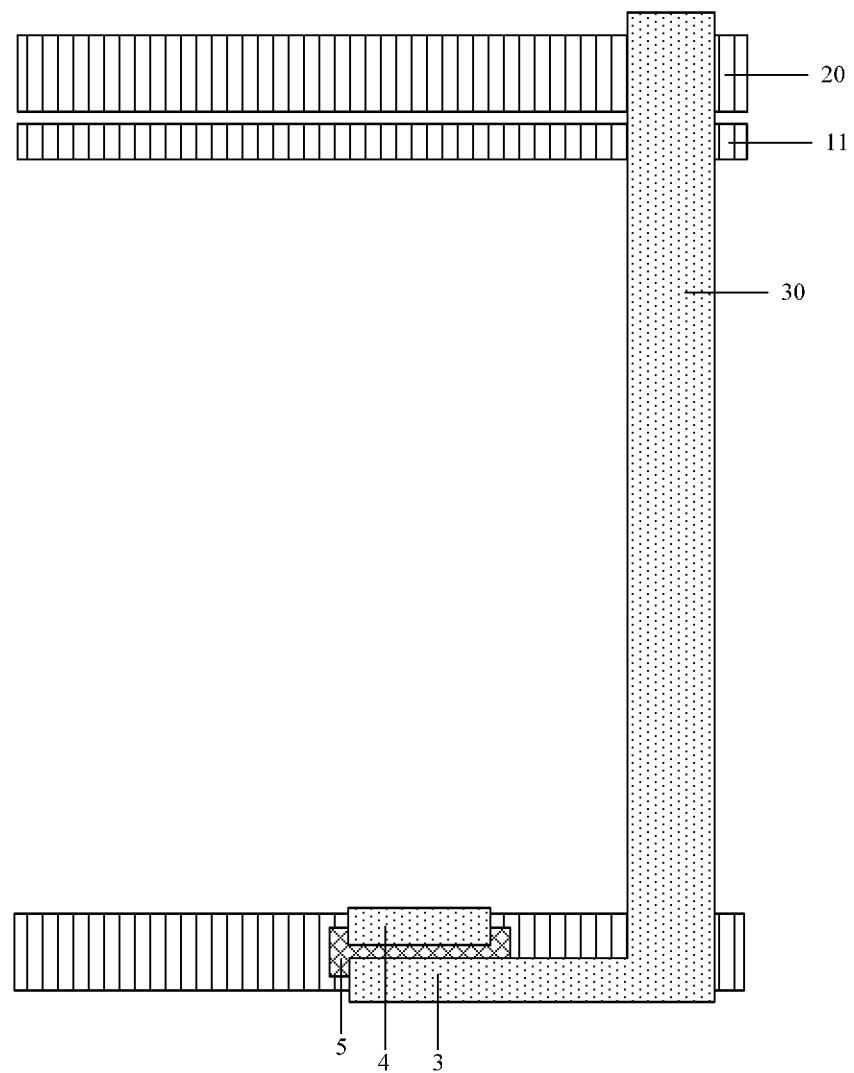

Step S5 includes forming a source-drain metal layer on the gate insulation layer 101 processed by step S4, coating the source-drain metal layer with photoresist, exposing and developing the photoresist to generate a photoresist reserved region and a photoresist unreserved region, etching off the source-drain metal layer in the photoresist unreserved region, and removing the remained photoresist to form the source electrodes 3 and the drain electrodes 4, where each of the source electrodes 3 and the corresponding drain electrode 4 are lapped on the two opposite sides of the corresponding active layer 5 respectively, as shown in FIG. 8.

The source-drain metal layer may be made of a metal such as Cu, Al, Ag, Mo, Cr, Nd, Ni, Mn, Ti, Ta, W or an alloy of two or more of the above metals, and the source-drain metal layer may be of a single layer structure or a multi-layer structure such as Cu\Mo, Ti\Cu\Ti or Mo\Al\Mo.

Figure 9:
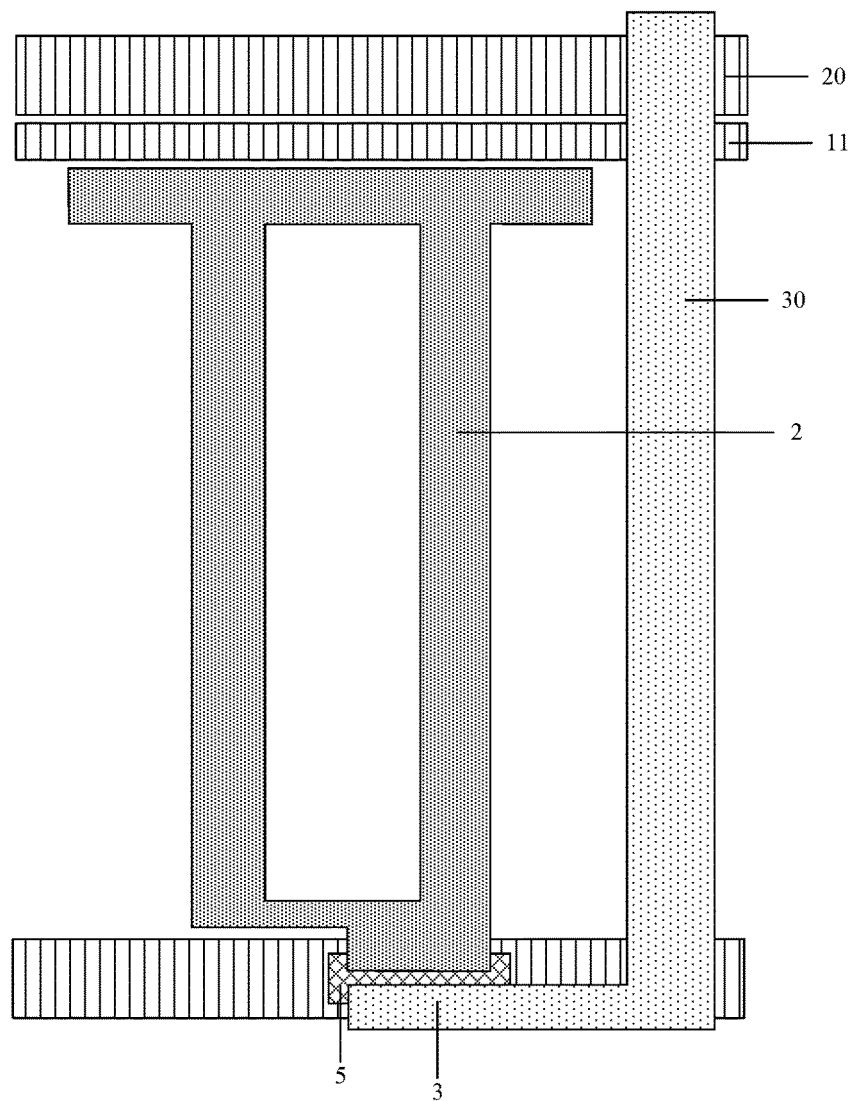

Step S6 includes forming the pixel electrodes 2 on the gate insulation layer 101 processed by step S5, where each of the pixel electrodes 2 is lapped on the drain electrode 4 of the corresponding TFT, as shown in combination of FIGS. 8 and 9.

The pixel electrodes 2 are made of a transparent conductive material, such as the indium zinc oxide or the indium tin oxide.

Step S7 includes forming the passivation layer 102 on the gate insulation layer 101 processed by step S6, and forming the via holes 6 penetrating through the gate insulation layer 101 and the passivation layer 102 by a patterning processing on the gate insulation layer 101 and the passivation layer 102, as shown in FIG. 4.

The passivation layer 102 may be made of oxide, nitride or nitrogen oxide, and may be of a single layer structure, a double layer structure or a multi-layer structure, and in particular, the passivation layer 102 may be made of SiNx, SiOx or Si(ON)x.

Step S8 includes forming the multiple common electrodes 1 on the gate insulation layer 101 processed by step S7. Each of the common electrodes 1 is arranged in the corresponding pixel region, the multiple common electrodes 1 further function as multiple touch electrodes 10, the common electrodes 1 included in each of the multiple touch electrodes 10 are electrically connected to each other by connection lines, and the connection lines and the common electrodes 1 form an integrated structure. Each of the signal lines 11 extends from the display region to the non-display region, one end of the signal line 11 is electrically connected to one common electrode 1 included in the corresponding touch electrode 10 through the corresponding via hole 6 penetrating through the gate insulation layer 101 and the passivation layer 102, so that the signal line 11 is electrically connected to the corresponding touch electrode 10, as shown in combination of FIGS. 2 and 4. The gate insulation layer 101 and the passivation layer 102 are arranged between each of the signal lines 11 and any one of the touch electrodes 10 other than the corresponding touch electrode 10, so that each of the signal lines 11 is insulated from any one of the touch electrodes 10 other than the corresponding touch electrode 10. In other words, in the extending direction of each of the signal lines from the display region to the non-display region, the gate insulation layer 101 and the passivation layer 102 are arranged between each of the signal lines 11 and the common electrode 1 included in any one of the touch electrodes 10 other than the corresponding touch electrode 10, as shown in combination of FIGS. 5 and 6.

The common electrodes 1 are made of a transparent conductive material, such as the indium zinc oxide or the indium tin oxide.

A procedure for forming the common electrodes 1 may include the following steps.

Firstly, a transparent conductive layer is formed on the base substrate 100 by a physical-depositing approach, a chemical-sputtering approach or the like.

Then, the transparent conductive layer is coated with photoresist, the photoresist is exposed and developed to generate a photoresist reserved region and a photoresist unreserved region. The photoresist reserved region corresponds to a region where the common electrodes and the connection lines are arranged, and the photoresist unreserved region corresponds to a region other than the region where the common electrodes and the connection lines are arranged.

Then, the transparent conductive layer in the photoresist unreserved region are removed while the transparent conductive layer in the photoresist reserved region are not removed.

Finally, the remained photoresist is removed to form a pattern including the common electrodes 1 and the connection lines. Two ends of each of the connection lines is connected to two neighboring common electrodes 1 respectively, and thus the multiple common electrodes 1 included in the touch electrode 10 are electrically connected.

Thus, manufacture of the array substrate is accomplished.

The present disclosure further provides in some embodiments a display device including the above IPS array substrate, so as to implement a built-in touch display device with a thinner thickness. Meanwhile, it enables to eliminate "ghost point" phenomenon which appears in a process of detecting a touch operation on the self-capacitive touch screen in related technology, reduce touch detection time and improve touch detection sensitivity.

The display device may includes an LCD panel, a mobile phone, a tablet computer, a television, a display, a notebook computer, a digital picture frame, a navigator or any other product or part having a display function.

In the above solutions, the common electrodes of the IPS array substrate further function as the touch electrodes, so as to implement the built-in touch display device with thinner thickness. It is further provided with multiple signal lines that are electrically connected to the touch electrodes in a one-to-one correspondence. During the touch time period included in the time period for displaying one frame of image, it is detected by the signal lines respectively whether self-capacitances of the touch electrodes are changed, so as to determine a touch position. In addition, since the signal lines and the touch electrodes are in the one-to-one correspondence, even if two or more touch electrodes are touched simultaneously, the two or more touch positions can be determined precisely, and it enables to eliminate "ghost point" phenomenon which appears in the process of detecting a touch operation on the self-capacitive touch screen in the related technology. Furthermore, self capacitances of all touch electrodes can be detected simultaneously. Comparing with the related technology where the horizontal detection and the vertical detection are successively performed on the array of touch electrodes, the present disclosure enables to reduce the detection time and improve the touch sensitivity.

The above are merely the preferred embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. An In-Plane Switching (IPS) array substrate, comprising a display region and a non-display region around the display region, wherein a plurality of pixel units is arranged in the display region, each of the plurality of pixel units comprises a slit common electrode and a slit pixel electrode, a time period for displaying one frame of image comprises a display time period and a touch time period, the slit common electrodes further function as a plurality of touch electrodes, and each of the plurality of touch electrodes comprises two or more slit common electrodes that are electrically connected;
wherein the IPS array substrate further comprises a plurality of signal lines that is electrically connected to the plurality of touch electrodes in a one-to-one correspondence; during the display time period, common voltage signals are transmitted to the touch electrodes by the corresponding signal lines; and during the touch time period, it is detected, through the corresponding signal lines, whether self-capacitances of the touch electrodes are changed;
the IPS array substrate further comprises data lines and gate lines;
portions of the signal lines arranged in the display region are arranged parallel to the gate lines; or portions of the signal lines arranged in the display region are arranged parallel to the data lines;
the signal lines each extend from the display region to the non-display region, and the signal lines extend from the display region to sides of two opposite long edges of the IPS array substrate being of a rectangular shape; and
each of the slit common electrodes is just arranged inside an area at which the pixel unit is located and does not overlap the gate lines and the data lines.

2. The IPS array substrate according to claim 1, wherein the IPS array substrate is a Thin Film Transistor (TFT) array substrate, regions of the pixel units are defined by intersections of the data lines and the gate lines, each of the pixel units further comprises a TFT, long edges of slits of the slit common electrodes and long edges of slits of the slit pixel electrodes are parallel to an extending direction of each of the data lines;
wherein the signal lines, the gate lines and gate electrodes of the TFTs are made of a same material and arranged at a same layer; or the signal lines, the data lines, and source electrodes and drain electrodes of the TFTs are made of a same material and arranged at a same layer.

3. The IPS array substrate according to claim 2, wherein an insulation layer is arranged between the signal lines and the touch electrodes, and each of the touch electrodes is electrically connected to the corresponding signal line through a corresponding via hole in the insulation layer.

4. The IPS array substrate according to claim 3, wherein the insulation layer comprises a gate insulation layer and a passivation layer;
the IPS array substrate comprises:
a base substrate;
when the gate lines, the signal lines and the gate electrodes of the TFTs are arranged at a same layer on the base substrate and made of a same material, the gate insulation layer covers the gate lines, the signal lines and the gate electrodes;
active layers of the TFTs that are arranged on the gate insulation layer;
the data lines, the source electrodes and the drain electrodes of the TFTs that are arranged at a same layer and made of a same material, wherein each of the source electrodes and the corresponding drain electrode are lapped on two opposite sides of the corresponding active layer respectively;
the pixel electrodes that are lapped on the drain electrodes respectively;
the passivation layer that covers the TFTs and the pixel electrodes; and
the common electrodes that are arranged on the passivation layer, wherein a projection of each signal line onto the base substrate overlaps a projection of the corresponding common electrodes onto the base substrate, and the corresponding common electrodes are electrically connected to the each signal line through the corresponding via hole penetrating through the gate insulation layer and the passivation layer.

5. The IPS array substrate according to claim 4, wherein each of the signal lines is not electrically connected to any one of the touch electrodes other than the corresponding touch electrode.

6. The IPS array substrate according to claim 2, wherein each of the touch electrodes is lapped on and electrically connected to the corresponding signal line.

7. The IPS array substrate according to claim 6, wherein each of the signal lines is separated from and not electrically connected to any one of the touch electrodes other than the corresponding touch electrode.

8. A method for manufacturing an In-Plane Switching (IPS) array substrate, wherein the IPS array substrate comprises a display region and a non-display region around the display region, wherein a plurality of pixel units is arranged in the display region, each of the plurality of pixel units comprises a slit common electrode and a slit pixel electrode, a time period for displaying one frame of image comprises a display time period and a touch time period, the slit common electrodes further function as a plurality of touch electrodes, and each of the plurality of touch electrodes comprises two or more slit common electrodes that are electrically connected;
wherein the IPS array substrate further comprises a plurality of signal lines that is electrically connected to the plurality of touch electrodes in a one-to-one correspondence; during the display time period, common voltage signals are transmitted to the touch electrodes by the corresponding signal lines; and during the touch time period, it is detected, through the corresponding signal lines, whether self-capacitances of the touch electrodes are changed;
the IPS array substrate further comprises data lines and gate lines;
portions of the signal lines arranged in the display region are arranged parallel to the gate lines; or portions of the signal lines arranged in the display region are arranged parallel to the data lines;
the signal lines each extend from the display region to the non-display region, and the signal lines extend from the display region to sides of two opposite long edges of the IPS array substrate being of a rectangular shape;
each of the slit common electrodes is just arranged inside an area at which the pixel unit is located and does not overlap the gate lines and the data lines;
wherein the method comprises a step of forming the plurality of pixel units in the display region, and a step of forming the plurality of signal lines that are electrically connected to the touch electrodes in the one-to-one correspondence.

9. The method according to claim 8, wherein the IPS array substrate is a Thin Film Transistor (TFT) array substrate, regions of the pixel units are defined by intersections of the data lines and the gate lines, each of the pixel units further comprises a TFT, long edges of slits of the slit common electrodes and long edges of slits of the slit pixel electrodes are parallel to an extending direction of each of the data lines;
the step of forming the plurality of signal lines comprises:
forming the plurality of signal lines, the gate lines and gate electrodes of the TFTs by a patterning process on a same gate metal layer, or forming the plurality of signal lines, the data lines, and source electrodes and drain electrodes of the TFTs by a patterning process on a same source-drain metal layer.

10. The method according to claim 9, further comprising steps of:
forming the gate metal layer, and forming a pattern comprising the plurality of signal lines by a patterning process on the gate metal layer;
forming an insulation layer, and forming via holes by a patterning process on the insulation layer; and
forming a transparent conductive layer on the insulation layer, and forming the common electrodes by a patterning process on the transparent conductive layer, wherein the common electrodes are electrically connected to the corresponding signal lines through the corresponding via holes in the insulation layer.

11. The method according to claim 10, wherein the insulation layer comprises a gate insulation layer and a passivation layer;
the method comprises steps of:
providing a base substrate;
forming the gate metal layer on the base substrate, and when forming the gate lines, the signal lines and the gate electrodes of the TFTs by a patterning process on the gate metal layer, forming the gate insulation layer that covers the gate lines, the signal lines and the gate electrodes;
forming active layers of the TFTs on the gate insulation layer;
forming the source-drain metal layer on the active layers, and forming the data lines, and the source electrodes and the drain electrodes of the TFTs by a patterning process on the source-drain metal layer;
forming the pixel electrodes that are lapped on the drain electrodes respectively;
forming the passivation layer that covers the TFTs and the pixel electrodes;
forming the via holes by a patterning process on the passivation layer and the gate insulation layer and exposing the signal lines from the via holes; and
forming the common electrodes on the passivation layer, wherein a projection of each signal line onto the base substrate overlaps a projection of the corresponding common electrodes onto the base substrate, and the corresponding common electrodes are electrically connected to the each signal line through the corresponding via hole penetrating through the gate insulation layer and the passivation layer.

12. The method according to claim 9, further comprising steps of:
forming the gate metal layer, and forming a pattern comprising the plurality of signal lines by a patterning process on the gate metal layer; and
forming a transparent conductive layer, and forming the common electrodes by a patterning process on the transparent conductive layer, wherein each of the touch electrodes is lapped on and electrically connected to the corresponding signal line.

13. A display device comprising an In-Plane Switching (IPS) array substrate, wherein the IPS array substrate comprises a display region and a non-display region around the display region, wherein a plurality of pixel units is arranged in the display region, each of the plurality of pixel units comprises a slit common electrode and a slit pixel electrode, a time period for displaying one frame of image comprises a display time period and a touch time period, the slit common electrodes further function as a plurality of touch electrodes, and each of the plurality of touch electrodes comprises two or more slit common electrodes that are electrically connected;
wherein the IPS array substrate further comprises a plurality of signal lines that is electrically connected to the plurality of touch electrodes in a one-to-one correspondence; during the display time period, common voltage signals are transmitted to the touch electrodes by the corresponding signal lines; and during the touch time period, it is detected, through the corresponding signal lines, whether self-capacitances of the touch electrodes are changed changed;

the IPS array substrate further comprises data lines and gate lines;

portions of the signal lines arranged in the display region are arranged parallel to the gate lines; or portions of the signal lines arranged in the display region are arranged parallel to the data lines;

the signal lines each extend from the display region to the non-display region, and the signal lines extend from the display region to sides of two opposite long edges of the IPS array substrate being of a rectangular shape;

each of the slit common electrodes is just arranged inside an area at which the pixel unit is located and does not overlap the gate lines and the data lines.

* * * * *

UNITED STATES PATENT AND TRADEMARK OFFICE
CERTIFICATE OF CORRECTION

| | | |
|---|---|---|
| PATENT NO. | : 10,197,837 B2 | Page 1 of 1 |
| APPLICATION NO. | : 15/305016 | |
| DATED | : February 5, 2019 | |
| INVENTOR(S) | : Rui Xu et al. | |

It is certified that error appears in the above-identified patent and that said Letters Patent is hereby corrected as shown below:

In the Claims

Column 14, Line 16, Claim 1:
After "is"
Delete "just".

Column 14, Line 18, Claim 1:
After "data lines"
Insert -- to reduce response time of touch detection --.

Column 15, Lines 13-14, 17, 18, 22, 24, 33, and 46, Claim 8:
Delete every instance of "comprises"
And replace with -- includes --.

Column 15, Line 43, Claim 8:
After "is"
Delete "just".

Column 15, Line 45, Claim 8:
After "data lines"
Insert -- to reduce response time of touch detection --.

Column 17, Line 18, Claim 13:
After "is"
Delete "just".

Column 17, Line 20, Claim 13:
After "data lines"
Insert -- to reduce response time of touch detection --.

Signed and Sealed this
Third Day of September, 2019

Andrei Iancu
*Director of the United States Patent and Trademark Office*